(12) United States Patent
Kamath et al.

(10) Patent No.: US 8,904,024 B2
(45) Date of Patent: Dec. 2, 2014

(54) SYSTEM AND METHOD FOR LOW DELAY FAST UPDATE FOR VIDEO STREAMING

(75) Inventors: Aadithya Vishwanath Kamath, Bangalore (IN); Prashanth Dixit, Bangalore (IN)

(73) Assignee: Ittiam Systems (P) Ltd, Bangalore (IN)

( * ) Notice: Subject to any disclaimer, the term of this patent is extended or adjusted under 35 U.S.C. 154(b) by 52 days.

(21) Appl. No.: 13/565,871

(22) Filed: Aug. 3, 2012

(65) Prior Publication Data

US 2014/0040495 A1 Feb. 6, 2014

(51) Int. Cl.
*H04N 21/647* (2011.01)

(52) U.S. Cl.
USPC .......................................................... 709/231

(58) Field of Classification Search
CPC .................. H04L 12/2649; H04L 2012/6467; H04L 21/2343; H04L 7/26031; H04N 19/00721
See application file for complete search history.

(56) References Cited

U.S. PATENT DOCUMENTS

| | | | |
|---|---|---|---|
| 6,611,561 B1* | 8/2003 | Hannuksela et al. | 375/240.27 |
| 7,876,685 B2* | 1/2011 | Botzko et al. | 370/235 |
| 2003/0115504 A1* | 6/2003 | Holliman et al. | 714/25 |
| 2007/0028286 A1* | 2/2007 | Greene et al. | 725/135 |
| 2008/0158333 A1* | 7/2008 | Krisbergh et al. | 348/14.01 |
| 2009/0067551 A1* | 3/2009 | Chen et al. | 375/340 |
| 2012/0030371 A1* | 2/2012 | Baptist et al. | 709/236 |
| 2012/0093017 A1* | 4/2012 | Liu et al. | 370/252 |
| 2012/0110420 A1* | 5/2012 | Lin et al. | 714/776 |
| 2012/0311173 A1* | 12/2012 | Agarwal et al. | 709/231 |
| 2013/0067109 A1* | 3/2013 | Dong et al. | 709/231 |

OTHER PUBLICATIONS

Wada, "Selective Recovery of Video Packet Loss Using Error Concealment", Jun. 1989, IEEE, vol. 7 No. 5, p. 807-814.*
Wada, "Selective Recovery of Video Packet Loss Using Error Concealment," 1989, IEEE, vol. 7 Issue 5, p. 807-814.*
Grangetto et al., "Ensuring Quality of Service for Image Transmission: Hybrid Loss Protection," 2004, IEEE, vol. 13 Issue 6, p. 751-757.*
Papavassiliou et al., "Spatial Distribution and Range Trade-offs for Frequency-hopped Spread Spectrum Networks Using the Ratio-threshold Test," 1991, IEEE, vol. 1, p. 137-141.*
Mahanti et al, "Scalable On-Demand Media Streaming with Packet Loss Recovery," Apr. 2003, ACM, p. 195-209.*
Dukkipati et al., "Proportional Rate Reduction for TCP," Nov. 2011, ACM, p. 155-169.*
(ACM Snapshot).*
(IEEE Snapshot).*

* cited by examiner

*Primary Examiner* — Kambiz Zand
*Assistant Examiner* — Demaris Brown
(74) *Attorney, Agent, or Firm* — Prakash Nama; Global IP Services, PLLC

(57) ABSTRACT

A system and method for low delay fast update, using multiple fast update pictures, for video streaming are disclosed. In one embodiment, a fast update request is received from a media client via a network by a media server to recover from packet losses. Further, one or more low delay fast update frames are generated based on packet loss statistics obtained during a steady state video streaming session by the media server. Furthermore, the generated one or more low delay fast update frames are sent to the media client to recover from the packet losses by the media server.

20 Claims, 6 Drawing Sheets

# US 8,904,024 B2

SYSTEM AND METHOD FOR LOW DELAY FAST UPDATE FOR VIDEO STREAMING

TECHNICAL FIELD

Embodiments of the present subject matter generally relate to video streaming. More particularly, embodiments of the present subject matter relate to low delay fast update for video streaming.

BACKGROUND

Typically, video streaming applications over the Internet are sensitive to bandwidth availability. Further, current video compression methods pose difficulty for real-time video streaming applications since video compression is not always strictly a constant bit rate (CBR) and fluctuations in an encoding bit rate cause periodic delays and subsequent network congestion. This is especially true for intra pictures (I-pictures) or intra frames (I-frames) in a video stream that are on an average about 5-6 times the size of a predictive picture (p-picture) or a predictive frame (p-frame). Each such I-frame causes an instantaneous peak bandwidth requirement in a network and can result in network congestion and packet losses.

Existing techniques utilize a CBR mode of compression and transmission that does not send periodic I-frames to address the above network congestion and packet loss problems. However, these techniques still do not address random or burst packet losses in the network due to external factors. Due to the predictive nature of the video compression, any packet loss results in incorrect prediction and the I-picture needs to be updated. Typically, this is done using instantaneous decoding refresh (IDR). In interactive streaming applications, a receiver of the video stream requests for the IDR to recover from the packet losses. Such a request is generally referred to as a "fast update request".

In the interactive streaming applications, the receiver requests for the fast update to recover from the packet losses. Current systems provide the IDR as a response to the fast update request. However, under normal operating conditions, the IDR or I-frames cause the network congestion and packet losses. Further, in situations where the receiver is already experiencing packet losses and the network is congested, sending the IDR may multiply negative effects of the network congestion and hence the effect will be severe. This results in a recurring loop of the IDR and packet losses.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for low delay fast update for video streaming are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
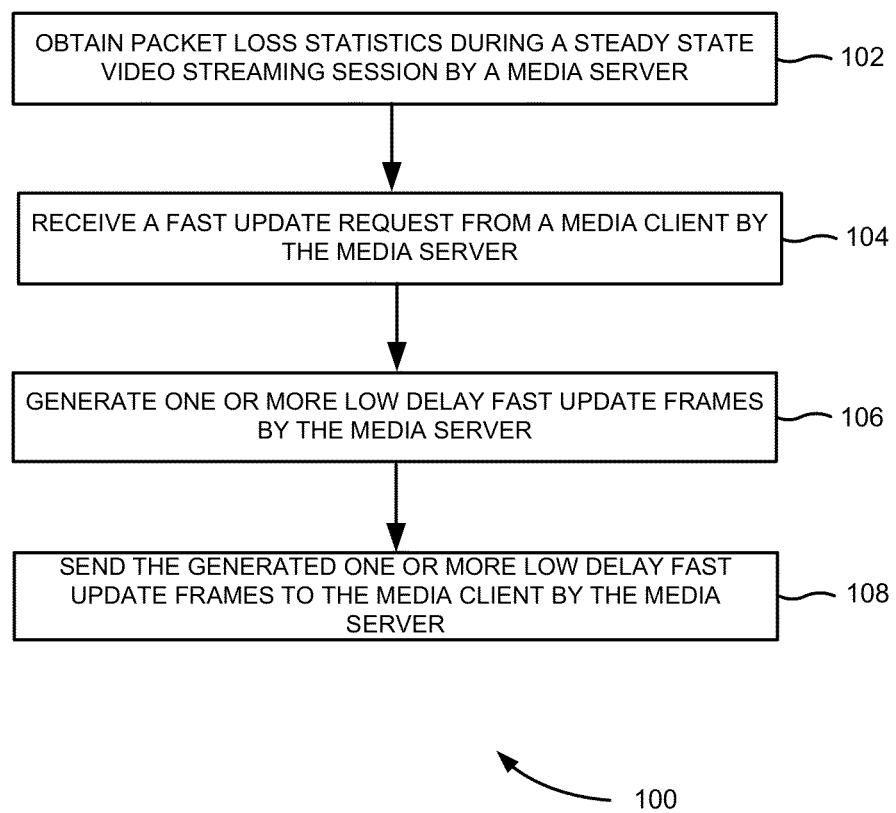
FIG. 1 illustrates a flowchart of a method for low delay fast update for video streaming, according to one embodiment.

FIG. 1 illustrates a flowchart 100 of a method for low delay fast update for video streaming, according to one embodiment. At block 102, packet loss statistics are obtained by a media server during a steady state video streaming session between the media server and a media client. This is explained in more detail with reference to FIG. 3. Exemplary media server includes a video phone, a mobile phone, a personal computer (PC) and the like. Exemplary media client includes a tablet, a mobile phone, a PC and the like. For example, the packet loss statistics include long term packet loss statistics and short term packet loss statistics. At block 104, a fast update request is received from the media client via a network by the media server to recover from packet losses. At block 106, one or more low delay fast update frames are generated based on the packet loss statistics obtained during the steady state video streaming session by the media server. In one embodiment, the one or more low delay fast update frames including intra-blocks or multiple slices are generated based on the packet loss statistics obtained during the steady state video streaming session by the media server. This is explained in more detail with reference to FIG. 2. At block 106, the generated one or more low delay fast update frames are sent to the media client to recover from the packet losses by the media server.

Figure 2:
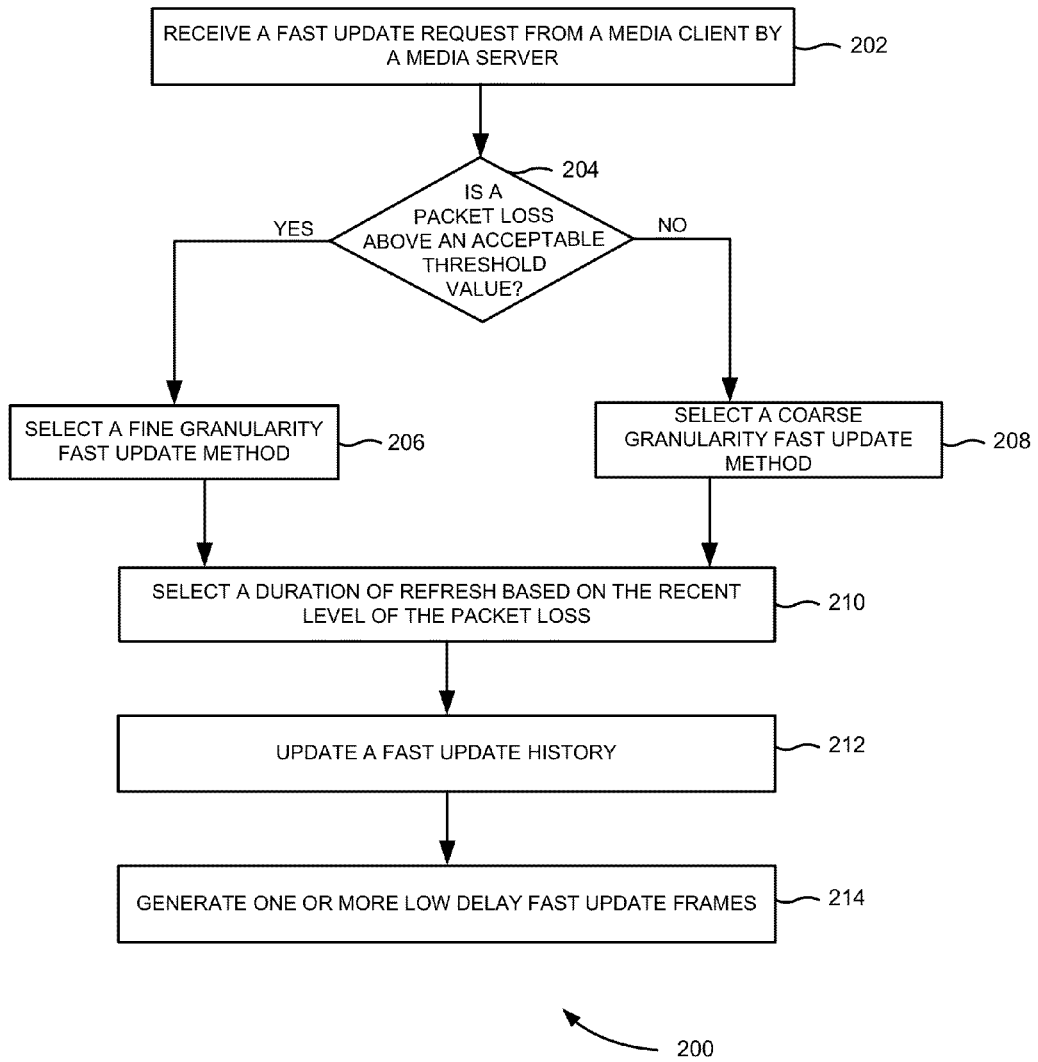
FIG. 2 illustrates another flowchart of a method for the low delay fast update for video streaming, according to one embodiment.

Referring now to FIG. 2, which is another flowchart 200 of a method for low delay fast update for video streaming, according to one embodiment. At block 202, a fast update request is received from a media client via a network by a media server to recover from packet losses. At block 204, it is determined whether the packet loss is above an acceptable threshold value. In one embodiment, it is determined whether the packet loss is above the acceptable threshold value by verifying packet loss statistics obtained during a steady state video streaming session by the media server. For example, the packet loss statistics include long term packet loss statistics and short term packet loss statistics. This is explained in more detailed with reference to FIG. 3. At block 206, a fine granularity fast update method is selected if the packet loss is above the acceptable threshold value. In the fine granularity fast update method, a higher number of fast update pictures are used with a lower percentage of intra picture updates per frame. In one embodiment, the fine granularity fast update method is an intra-block fast update method. For example, a picture refresh is performed by a sequence of I-picture macro blocks spread over several frames using the intra-block fast update method.

At block 208, a coarse granularity fast update method is selected if the packet loss is below the acceptable threshold value. In the coarse granularity fast update method, a lower number of fast update pictures are used with a higher percentage of the intra picture updates per frame. In one embodiment, the coarse granularity fast update method includes a multiple pictures slices fast update method. For example, the picture refresh is performed by a sequence of I-slices (sub-pictures) spread over several frames using the sliced based fast update method. At block 210, a duration of refresh is selected based on the recent level of packet loss. At block 212, a fast update history is updated. At block 214, one or more low delay fast update frames are generated based on the long term packet loss statistics and short term packet loss statistics obtained during the steady state video streaming session by the media server. In one embodiment, the duration of refresh and the method of refresh are configured in the media server. Further, the one or more low delay fast update frames are generated based on the long term packet loss statistics and short term packet loss statistics obtained during the steady state video streaming session by the media server.

Figure 3:
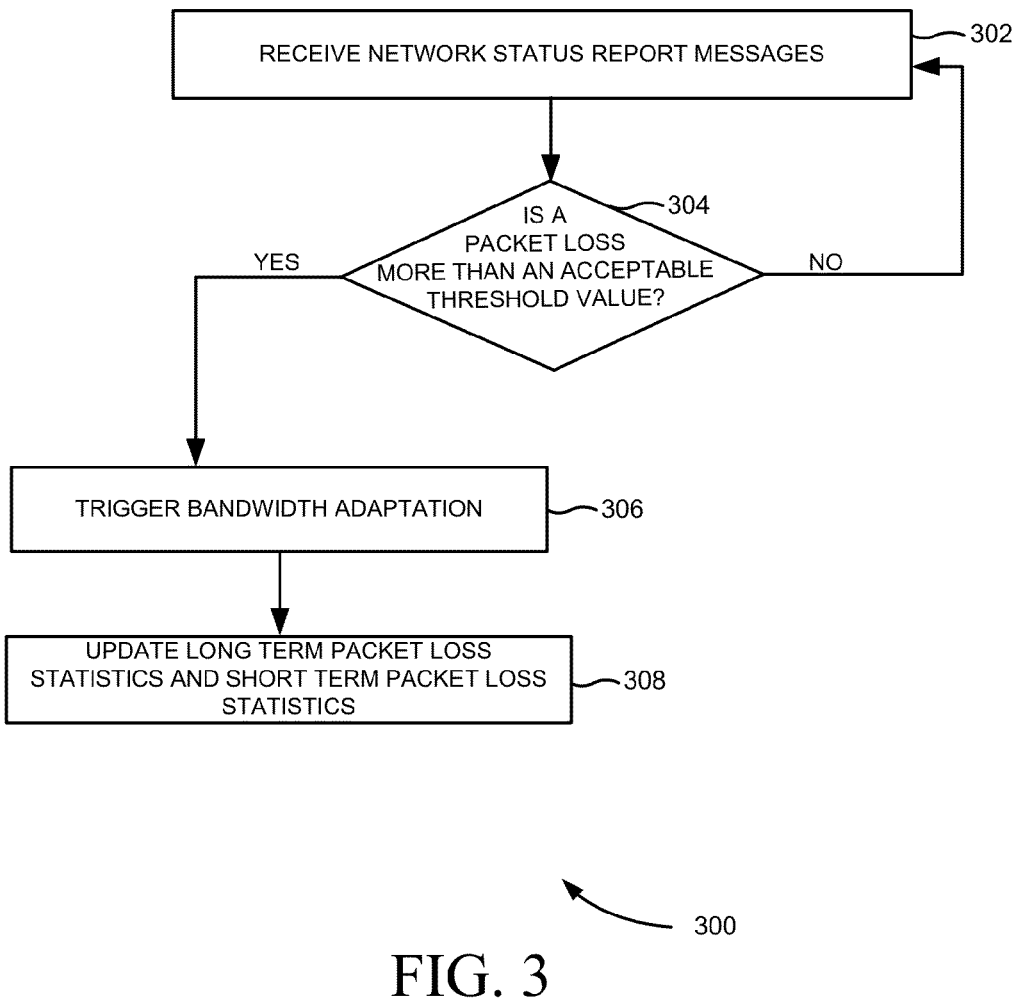
FIG. 3 illustrates a flowchart of a method of steady state video streaming, according to one embodiment.

FIG. 3 illustrates a flowchart 300 of a method of steady state video streaming, according to one embodiment. At block 302, network status report messages including packet loss information are received from a media client by a media server. In one embodiment, request for comments (RFC) 3551 based real-time transport control protocol (RTCP) reports including packet loss information are received by the media server from the media client. At block 304, it is determined whether the packet loss is more than an acceptable threshold value. At block 306, the bandwidth adaptation is triggered if the packet loss is more than the acceptable threshold value. At block 308, long term packet loss statistics and short term packet loss statistics are updated. The process steps from block 302 are repeated if the packet loss is less than the acceptable threshold value.

Figure 4:
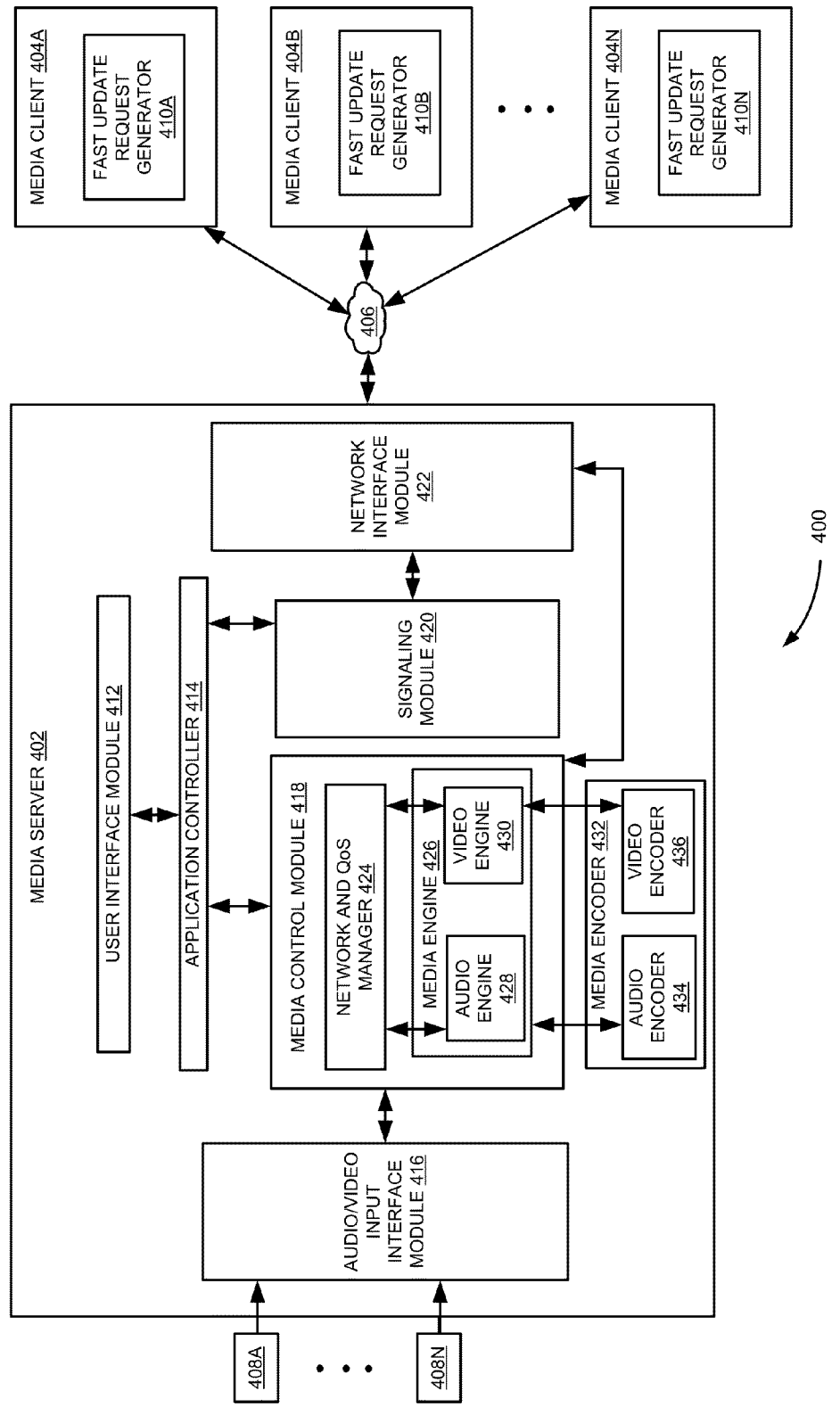
FIG. 4 illustrates a block diagram including major components and their interconnectivity of a system for the low delay fast update for video streaming methods of FIGS. 1 and 2, according to one embodiment.

Referring now to FIG. 4, which is a block diagram including major components and their interconnectivity of a system 400 for low delay fast update for video streaming methods of FIGS. 1 and 2, according to one embodiment. As shown in FIG. 4, the system 400 includes a media server 402, a plurality of media clients 404A-N, and a plurality of media input devices 408A-N. Further, the media server 402 includes a user interface module 412, an application controller 414, an audio/video input interface module 416, a media control module 418, a signaling module 420, a network interface module 422, and a media encoder 432. Furthermore, the media control module 418 includes a network and quality of service (QoS) manager 424 and a media engine 426. In addition, the media engine 426 includes an audio engine 428 and a video engine 430. Moreover, the media encoder 432 includes an audio encoder 434 and a video encoder 436. Also, the plurality of media clients 404A-N includes fast update request generators 410A-N, respectively.

Further as shown in FIG. 4, the media clients 404A-N are coupled to the media server 402 via a network 406. Furthermore, the plurality of media input devices 408A-N is couple to the audio/video input interface module 416. In addition, the audio/video input interface module 416 is coupled to the media control module 418. For example, the plurality of media input devices 408A-N includes video input devices and audio input devices. Moreover, the application controller 414 is coupled to the user interface module 412, the media control module 418 and the signaling module 420. Also, the network interface module 422 is coupled to the signaling module 420 and the media control module 418. Further, the network and QoS manager 424 is coupled to the audio engine 428 and the video engine 430. Furthermore, the audio engine 428 is coupled to the audio encoder 434. Moreover, the video engine 430 is coupled to the video encoder 436.

In one embodiment, the media server 402 receives audio/video streams from the media input devices 408A-N. In one exemplary implementation, the audio/video input interface module 416 receives the audio/video streams from the media input devices 408A-N. Further, the media server 402 transmits the audio/video streams to the media clients 404A-N via the network 406. In one exemplary implementation, the media server 402 transmits the video streams with missing packets to the media clients 404A-N via the network 406. Exemplary network 406 includes an asymmetric digital subscriber line (ADSL), a third generation (3G) network and the like. Furthermore, the media server 402 receives a fast update request from one of the media clients 404A-N via the network 406 to recover from packet losses. In one exemplary implementation, the signaling module 420 receives the fast update request from one of the fast update request generators 410A-N associated with the one of the media client 404A-N via the network 406 and the network interface module 422.

In addition, the media encoder 432 generates one or more low delay fast update frames based on packet loss statistics obtained during a steady state video streaming session from the network and QoS manager 424. For example, the media encoder 432 generates the one or more low delay fast update frames including intra-blocks or multiple slices based on the packet loss statistics obtained during the steady state video streaming session by the media server 402. For example, the media encoder 432 supports for a fast update with configurations for a time window of the low delay fast update and a method of the low delay fast update through intra-blocks or multiple slices. In one embodiment, the network and QoS manager 424 includes an algorithm to tune the fast update mechanism based on network status report messages and fast update requests received from the media clients 404A-N. For example, the algorithm selects the method of picture refresh, the duration of the refresh, a data rate during the refresh and other parameters that affect perceptual video quality and user experience.

In one exemplary implementation, the network and QoS manager 424 obtains the packet loss statistics during the steady state video streaming session between the media server 402 and the one of the media clients 404A-N. In one embodiment, the media server 402 receives the network status report messages with packet loss information from the one of the media clients 404A-N. Particularly, the network and QoS manager 424 receives the network status report messages with packet loss information from the one of the media clients 404A-N. Further in this embodiment, the network and QoS manager 424 determines whether the packet loss during the steady state video streaming session is more than an acceptable threshold value. Furthermore in this embodiment, the network and QoS manager 424 triggers bandwidth adaptation and updates the long term packet loss statistics and short term packet loss statistics if the packet loss during the steady state video streaming session is more than the acceptable threshold value. In addition in this embodiment, the network and QoS manager 424 repeats the receiving and determining steps if the packet loss during the steady state video streaming session is less than the acceptable threshold value. Moreover, the media server 402 sends the generated one or more low delay fast update frames to the one of the media clients 404A-N to recover from the packet losses.

Figure 5:
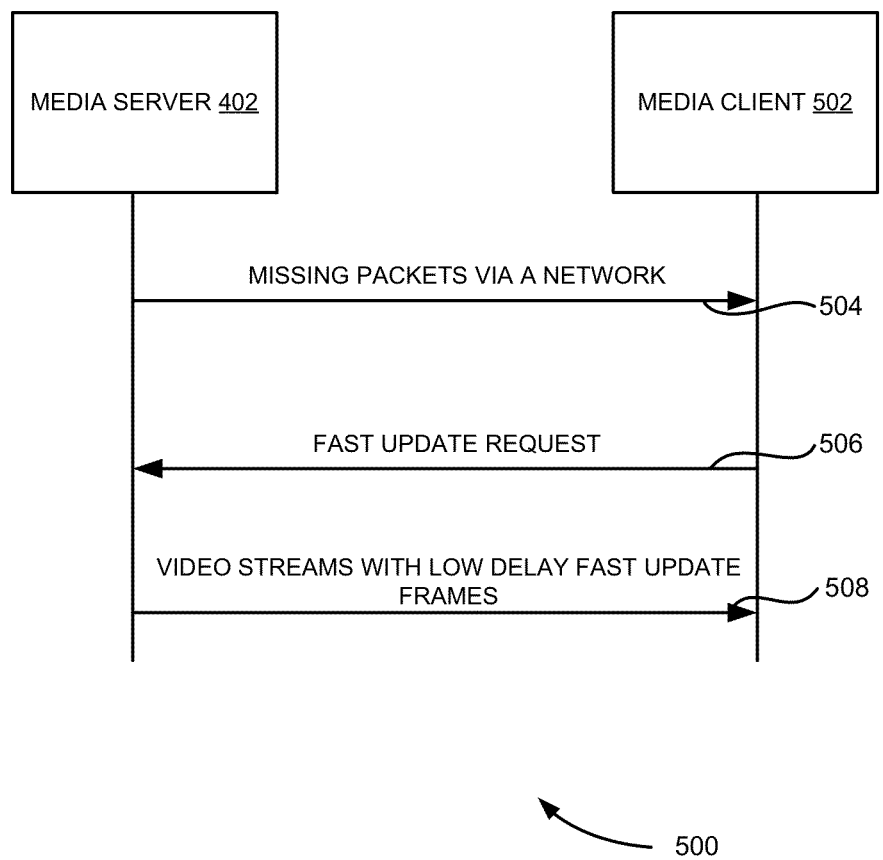
FIG. 5 illustrates a sequence of events between a media server and a media client, such as those shown in FIG. 4, according to one embodiment.

Referring now to FIG. 5, which illustrates a sequence of events 500 between the media server 402 and a media client 502, such as those shown in FIG. 4, according to one embodiment. As shown in FIG. 5, 504 indicates sending video streams including missing packets by the media server 402 to the media client 502 via a network. Further, 506 indicates receiving a fast update request from the media client 502 by the media server 402 via the network to recover from packet losses. Furthermore, 508 indicates sending the video streams with one or more low delay fast update frames to the media client 502 by the media server 402.

Figure 6:
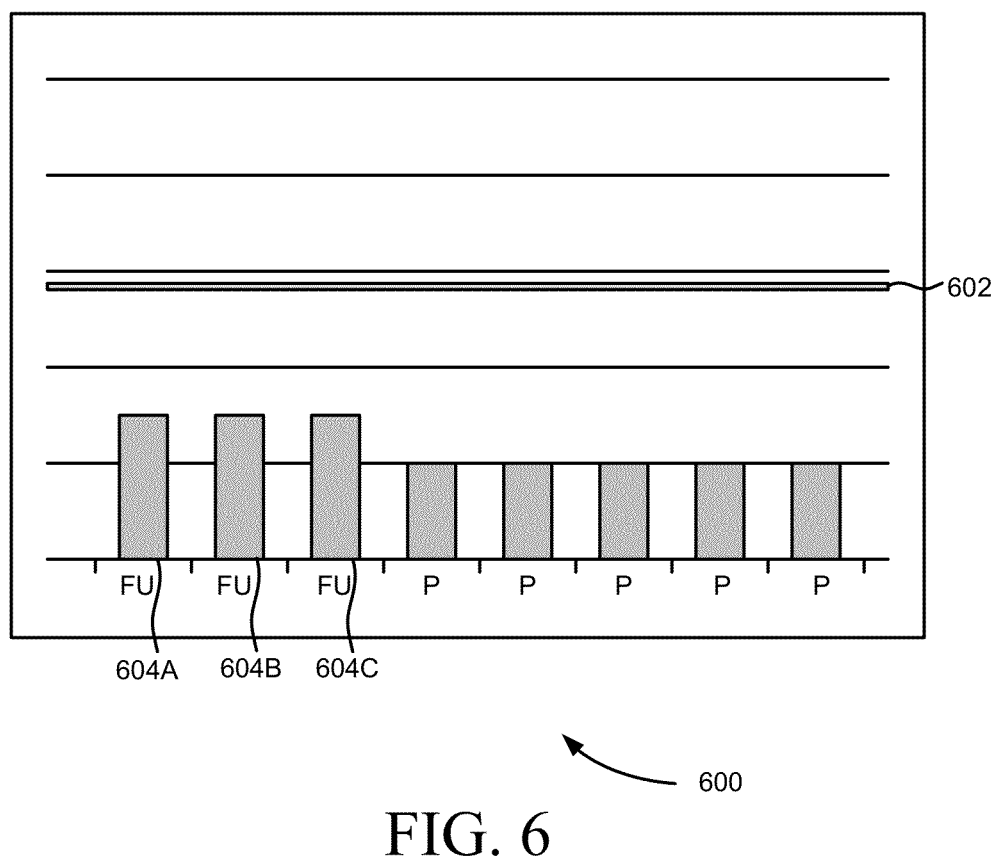
FIG. 6 illustrates a bar graph showing the low delay fast update of video streaming achieved using multiple fast update (FU) pictures, according to one embodiment.

Referring now to FIG. 6, which is a bar graph 600 showing the low delay fast update of video streaming achieved using multiple fast update (FU) pictures 604A-C, according to one embodiment. As shown in FIG. 6, the bar graph 600 shows the multiple FU pictures 604A-C providing an IDR or intra frame (I-frame) without exceeding an available bandwidth 602.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a computer system and may be performed in any order (e.g., including using means for achieving the various operations). Accordingly, the specification and drawings are to be regarded in an illustrative rather than a restrictive sense.

In various embodiments, systems and methods described with reference to FIGS. 1 through 6 propose the low delay fast update for video streaming. Further, the media server sends one or more low delay fast update frames, which collectively provide a picture refresh in a short amount of time, to the media client.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for low delay fast update for video streaming, comprising:
 receiving a fast update request from a media client via a network by a media server to recover from packet losses;
 generating multiple low delay fast update frames based on packet loss statistics obtained during a steady state video streaming session by the media server, comprising:
  determining whether a packet loss level during the steady state video streaming session is above an acceptable threshold value by verifying the packet loss statistics obtained during the steady state video streaming session;
  if so, generating the multiple low delay fast update frames including a higher number of fast update frames with a lower percentage of intra picture updates per frame; and
  if not, generating the multiple low delay fast update frames including a lower number of fast update frames with a higher percentage of the intra picture updates per frame;
 and
 sending the generated low delay fast update frames to the media client to recover from the packet losses by the media server.

2. The method of claim 1, further comprising:
 obtaining the packet loss statistics by the media server during the steady state video streaming session between the media server and the media client.

3. The method of claim 2, wherein the packet loss statistics comprise long term packet loss statistics and short term packet loss statistics.

4. The method of claim 3, wherein obtaining the packet loss statistics during the steady state video streaming session by the media server comprises:
 receiving network status report messages including packet loss information from the media client by the media server;
 determining whether the packet loss level during the steady state video streaming session is more than the acceptable threshold value;
 if so, triggering bandwidth adaptation and updating the long term packet loss statistics and short term packet loss statistics; and
 if not, repeating the receiving and determining steps.

5. The method of claim 1, wherein generating the multiple low delay fast update frames based on the packet loss statistics obtained during the steady state video streaming session by the media server comprises:
 generating the multiple low delay fast update frames including intra-blocks or multiple slices based on the packet loss statistics obtained during the steady state video streaming session by the media server.

6. The method of claim 1, wherein the media server includes devices selected from the group consisting of a video phone, a mobile phone and a personal computer (PC).

7. The method of claim 1, wherein the media client includes devices selected from the group consisting of a tablet, a mobile phone and a PC.

8. A system for low delay fast update for video streaming, comprising:
 one or more media input devices;
 a media server coupled to the one or more media input devices; and
 one or more media clients coupled to the media server via a network, wherein the media server receives a fast update request from one of the one or more media clients via the network to recover from packet losses,
 wherein the media server generates multiple low delay fast update frames based on packet loss statistics obtained during a steady state video streaming session, comprising:
  determining whether a packet loss level during the steady state video streaming session is above an acceptable threshold value by verifying the packet loss statistics obtained during the steady state video streaming session,
  if so, generating the multiple low delay fast update frames including a higher number of fast update frames with a lower percentage of intra picture updates per frame, and if not, generating the multiple low delay fast update frames including a lower number of fast update frames with a higher percentage of the intra picture updates per frame, and wherein the media server sends the generated low delay fast update frames to the one of the one or more media clients to recover from the packet losses.

9. The system of claim 8, wherein the media server is further configured to:

obtain the packet loss statistics during the steady state video stream session between the media server and the media client.

10. The system of claim 9, wherein the packet loss statistics comprise long term packet loss statistics and short term packet loss statistics.

11. The system of claim 10, wherein the media server is configured to:

receive network status report messages including packet loss information from the media client;

determine whether the packet loss level during the steady state video streaming session is more than the acceptable threshold value;

if so, trigger bandwidth adaptation and update the long term packet loss statistics and short term packet loss statistics; and if not, repeat the receiving and determining steps.

12. The system of claim 8, wherein the media server is configured to:

generate the multiple low delay fast update frames including intra-blocks or multiple slices based on the packet loss statistics obtained during the steady state video streaming session.

13. The system of claim 8, wherein the is media server includes devices selected from the group consisting of a video phone, a mobile phone and a personal computer (PC).

14. The system of claim 8, wherein the media client includes devices selected from the group consisting of a tablet, a mobile phone and a PC.

15. A non-transitory computer-readable storage medium for low delay fast update for video streaming, when executed by a computing device, cause the computing device to:

receive a fast update request from a media client via a network by a media server to recover from packet losses;

generate multiple low delay fast update frames based on packet loss statistics obtained during a steady state video streaming session by the media server, comprising:

determining whether a packet loss level during the steady state video streaming session is above an acceptable threshold value by verifying the packet loss statistics obtained during the steady state video streaming session;

if so, generating the multiple low delay fast update frames including a higher number of fast update frames with a lower percentage of intra picture updates per frame; and if not, generating the multiple low delay fast update frames including a lower number of fast update frames with a higher percentage of the intra picture updates per frame;

and send the generated low delay fast update frames to the media client to recover from the packet losses by the media server.

16. The non-transitory computer-readable storage medium of claim 15, further comprising:

obtaining the packet loss statistics by the media server during the steady state video streaming session between the media server and the media client.

17. The non-transitory computer-readable storage medium of claim 16, wherein the packet loss statistics comprise long term packet loss statistics and short term packet loss statistics.

18. The non-transitory computer-readable storage medium of claim 17, wherein obtaining the packet loss statistics during the steady state video streaming session comprises:

receiving network status report is including packet loss information from the media client by the media server;

determining whether the packet loss level during the steady state video streaming session is more than the acceptable threshold value;

if so, triggering bandwidth adaptation and updating the long term packet loss statistics and short term packet loss statistics; and if not, repeating the receiving and determining steps.

19. The non-transitory computer-readable storage medium of claim 15, wherein generating the multiple low delay fast update frames based on the packet loss statistics obtained during the steady state video streaming session by the media server comprises:

generating the multiple low delay fast update frames including intra-blocks or multiple slices based on the packet loss statistics obtained during the steady state video streaming session by the media server.

20. The method of claim 1, wherein generating the multiple low delay fast update frames including the higher number of fast update frames with the lower percentage of intra picture updates per frame is based on a fine granularity fast update method, and wherein generating the multiple low delay fast update frames including the lower number of fast update frames with the higher percentage of the intra picture updates per frame is based on a coarse granularity fast update method.

* * * * *